United States Patent
Hsu

(10) Patent No.: US 11,605,237 B1
(45) Date of Patent: Mar. 14, 2023

(54) SMART CARD FINGERPRINT RECOGNITION MODULE PACKAGING STRUCTURE AND MANUFACTURING METHOD THEREOF

(71) Applicant: PHOENIX PIONEER TECHNOLOGY CO., LTD., Hsinchu County (TW)

(72) Inventor: Che-Wei Hsu, Hsinchu County (TW)

(73) Assignee: PHOENIX PIONEER TECHNOLOGY CO., LTD., Hsinchu County (TW)

( * ) Notice: Subject to any disclaimer, the term of this patent is extended or adjusted under 35 U.S.C. 154(b) by 0 days.

(21) Appl. No.: 17/886,495

(22) Filed: Aug. 12, 2022

(30) Foreign Application Priority Data

Sep. 7, 2021 (TW) .................................. 110133257

(51) Int. Cl.
*G06V 40/13* (2022.01)

(52) U.S. Cl.
CPC .......... *G06V 40/1306* (2022.01); *G06V 40/13* (2022.01)

(58) Field of Classification Search
CPC . H01L 23/3128; H01L 21/486; H01L 21/561; H01L 21/568; H01L 23/295; H01L 23/5384; H01L 23/5386; H01L 23/5389; H01L 24/19; H01L 24/20; H01L 24/11; H01L 24/16; H01L 2224/0231; H01L 2224/02379; H01L 2224/13024; H01L 2224/16225; H01L 2224/18; H01L 2224/211; H01L 2224/215; H01L 2924/01029; H01L 23/49822; H01L 23/49827; H01L 23/49816; G06V 40/13; G06V 40/1365; G06V 40/1318

See application file for complete search history.

(56) References Cited

U.S. PATENT DOCUMENTS

| | | | | |
|---|---|---|---|---|
| 2005/0001331 | A1* | 1/2005 | Kojima | H01L 23/3121 257/E23.128 |
| 2013/0337648 | A1* | 12/2013 | Lin | H01L 23/5389 438/675 |
| 2018/0294299 | A1* | 10/2018 | Baek | H01L 27/14689 |
| 2019/0206754 | A1* | 7/2019 | Hsu | H01L 23/3128 |

* cited by examiner

*Primary Examiner* — Abhishek Sarma
(74) *Attorney, Agent, or Firm* — WPAT, PC

(57) ABSTRACT

A smart card fingerprint identification module packaging structure includes a first insulating layer, an insulating protective layer, a shielding layer, a second insulating layer, a fingerprint sensing area and bump pads. A first patterned circuit layer is embedded in the first insulating layer, and part of this layer serves as a first sensing circuit. A second patterned circuit layer is disposed on the second surface of the first insulating layer, and part of this layer serves as a second sensing circuit. A patterned metal layer is disposed on the second insulating layer and covers the outer surface of the second insulating layer as a shielding layer. The shielding layer corresponding to the first and the second sensing circuits is hollowed out to serve as a fingerprint sensing area. The longitudinal projections of the first sensing circuit and the second sensing circuit are staggered from each other without overlapping.

10 Claims, 5 Drawing Sheets

SMART CARD FINGERPRINT RECOGNITION MODULE PACKAGING STRUCTURE AND MANUFACTURING METHOD THEREOF

CROSS REFERENCE TO RELATED APPLICATION

All related applications are incorporated by reference. The present application is based on, and claims priority from, Taiwan Application Serial Number 110133257, filed on Sep. 7, 2021, the disclosure of which is hereby incorporated by reference herein in its entirety.

TECHNICAL FIELD

The technical field relates to a capacitive-type fingerprint sensing identification module structure, in particular to a smart card fingerprint identification module packaging structure and the manufacturing method thereof.

BACKGROUND

The popularization of contact-type IC cards and non-contact type IC cards has become a trend in the world. Implanting chips into various non-contact type cards can achieve can make these cards be more comprehensive in application and convenient to use. The application of these cards include credit cards, bank cards, campus cards, community resident cards, access cards, public transportation cards, etc. The latest IC fingerprint chip bank cards or IC credit cards further provide the fingerprint identification function. These cards will sense and transmit the fingerprint verification information to the banks as the proofs of transferring or payment approvals.

A currently available IC fingerprint chip card directly integrates and packages a fingerprint identification module with the fingerprint identification sensing chip with each other, so that the size of the fingerprint identification sensing chip is too large and the manufacturing cost thereof is also increased. Besides, the installation position of the fingerprint identification sensing chip is also limited, which influences the antistatic ability thereof.

SUMMARY

To achieve the foregoing objective, the present invention provides a smart card fingerprint identification module packaging structure and the manufacturing method thereof. The capacitive-type fingerprint sensing identification module can be independently packaged on one substrate, such that the fingerprint sensing identification module and the fingerprint identification sensing chip can be separately packaged on different printed circuit boards. In this way, the manufacturing cost of the smart card fingerprint identification module packaging structure can be reduced and the layout thereof can be more flexible. In addition, the antistatic ability thereof can be further enhanced. Moreover, the smart card fingerprint identification module packaging structure adopts the flexible and bendable dielectric material or insulating material, such that the packaging structure can be bent to a certain degree without influencing the function thereof.

One embodiment of the present invention provides a smart card fingerprint identification module packaging structure, which include a first insulating layer, a first patterned circuit layer, at least one first conductive post, a second patterned circuit layer, an insulating protective layer, a second insulating layer, at least one second conductive post and a shielding layer. The first insulating layer having a first surface and a second surface opposite to the each other. The first patterned circuit layer is embedded in the first insulating layer and one side of the first patterned circuit layer is exposed from the first surface of the first insulating layer. The conductive post is embedded in the first insulating layer; one of the end surfaces of the first conductive post is electrically connected to the first patterned circuit layer and the other of the end surfaces of the first conductive post is exposed from the second surface of the first insulating layer. The second patterned circuit layer is disposed on the second surface of the first insulating layer and electrically connected to the exposed end surface of the first conductive post. The insulating protective layer is disposed on the second surface of the first insulating layer to partially cover the second patterned circuit layer and the second sensing circuit. The second insulating layer has a third surface and a fourth surface opposite to each other, and disposed on the first surface of the first insulating layer in order to cover the first patterned circuit layer and the first surface of the first insulating layer. The second conductive post is embedded in the second insulating layer; one of the end surfaces of the second conductive post is electrically connected to the first patterned circuit layer and the other of the end surfaces of the second conductive post is exposed from the third surface of the second insulating layer. The shielding layer is formed by a patterned metal layer disposed on the third surface of the second insulating layer and electrically connected to the exposed end surface of the second conductive post. A part of the first patterned circuit layer serves as a first sensing circuit; a part of the second patterned circuit layer serves as a second sensing circuit and another part of the second patterned circuit layer serves as a bump pad, such that the bump pad is exposed from the insulating protective layer. In addition, the fourth surface of the second insulating layer and the first surface of the first insulating layer pass through a common plane. Further, the longitudinal projection zone of the shielding layer corresponding to the first sensing circuit and the second sensing circuit is hollowed out to serve as a fingerprint sensing area.

Another embodiment of the present invention provides a manufacturing method of a smart card fingerprint identification module packaging structure, which includes the following steps: providing a first substrate; forming a first patterned circuit layer and at least one first conductive post on the first substrate by photolithography and electroplating, wherein the first conductive post is erected on the first patterned circuit layer and a part of the first patterned circuit layer serves as a first sensing circuit; forming a first insulating layer on the first substrate to cover the first patterned circuit layer and the first conductive post and removing a part of the first insulating layer to expose one end surface of the first conductive post; forming a second patterned circuit layer on the first insulating layer by photolithography and electroplating, wherein the second patterned circuit layer is electrically connected to the exposed end surface of the first conductive post, a part of the second patterned circuit layer serves as a second sensing circuit and another part of the second patterned circuit layer serves as a bump pad; forming an insulating protective layer on the first insulating layer to partially cover the second patterned circuit layer and the second sensing circuit, such that the bump pad is exposed; providing a second substrate and combining the second substrate with the insulating protective layer, and totally removing the first substrate to expose the surface of one side of the first patterned circuit layer and the surface of one side of the first insulating layer; forming at least one second conductive post on the surface of the exposed side of the first patterned circuit layer by photolithography and electroplating; forming a second insulating layer on the surface of the first insulating layer to cover the surface of the exposed side of the first patterned circuit layer and the second conductive post, and removing a part of the second insulating layer to expose one end surface of the second conductive post; forming a patterned metal layer on the second insulating layer by photolithography and electroplating to serve as a shielding layer electrically connected to the exposed end surface of the second conductive post, wherein a longitudinal projection zone of the shielding layer corresponding to the first sensing circuit and the second sensing circuit is hollowed out to serve as a fingerprint sensing area; and removing the second substrate to expose the insulating protective layer and the bump pad.

Still another embodiment of the present invention provides an IC fingerprint chip card structure, which includes a smart card fingerprint identification module packaging structure, an interposer and a fingerprint identification sensing chip and a printed circuit board. The smart card fingerprint identification module packaging structure can be electrically connected to the printed circuit board via the bump pads and the packaging solder balls. In addition, the smart card fingerprint identification module packaging structure and the fingerprint identification sensing chip can be separately packaged in the printed circuit board (via the interposer).

Compared with prior art, the smart card fingerprint identification module packaging structure according to the embodiments of the present invention can integrate the capacitive-type fingerprint sensing identification module in a flexible and bendable packaging substrate. Moreover, the capacitive-type fingerprint sensing identification module and the sensing chip are separately packaged, which can effectively the size of the packaged sensing chip in order to decrease the cost thereof and avoid that the sensing chip is penetrated through by the static electricity generated by the identification module. Therefore, the antistatic ability of the packaging structure can be effectively enhanced. Further, the packaging structure can make sure that the smart card can still provide the fingerprint identification function when the smart card is bent due to external force.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
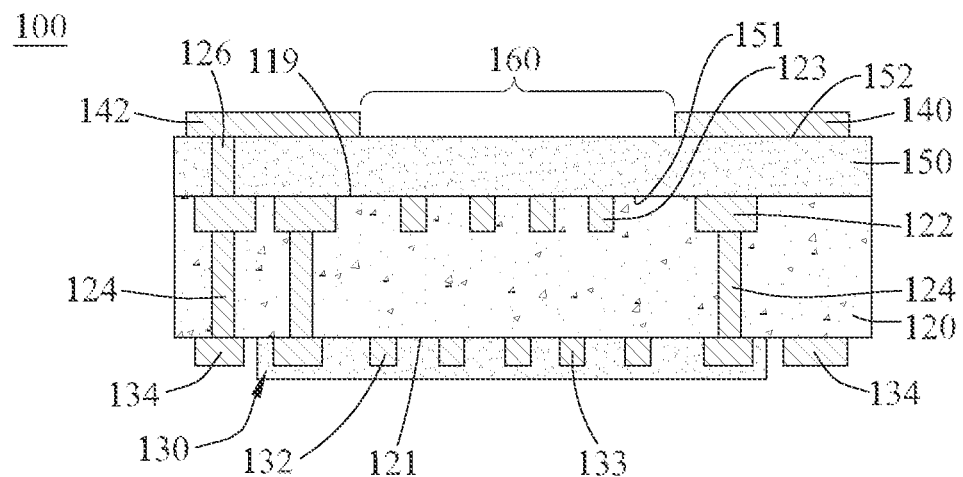
FIG. 1 is a sectional view of a smart card fingerprint identification module packaging structure in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a sectional view of a smart card fingerprint identification module packaging structure in accordance with one embodiment of the present invention. As shown in FIG. 1, the smart card fingerprint identification module packaging structure 100 includes a first insulating layer 120, a first patterned circuit layer 122, at least one first conductive post 124, a second patterned circuit layer 134, an insulating protective layer 130, a second insulating layer 150, at least one second conductive post 126 and a shielding layer 140.

The first insulating layer 120 is made of a flexible and bendable dielectric material or insulating material. Besides, the first insulating layer 120 has a first surface 119 and a second surface 121 opposite to each other.

The first patterned circuit layer 122 is embedded in the first insulating layer 120. One side of the first patterned circuit layer 122 is exposed from the first surface 119 of the first insulating layer 120 and a part of the first patterned circuit layer 122 serves as a first sensing circuit 123.

The first conductive post 124 is embedded in the first insulating layer 120. One of the end surfaces of the first conductive post 124 is electrically connected to the first patterned circuit layer 122 and the other of the end surfaces of the first conductive post 124 is exposed from the second surface 121 of the first insulating layer 120. The first conductive post 124 may be a metal post, such as a cooper post.

The second patterned circuit layer 132 is disposed on the second surface 121 of the first insulating layer 120 and electrically connected to the exposed end surface of the first conducting post 124. A part of the second patterned circuit layer 132 serves as a second sensing circuit 133 and the other part of the second patterned circuit layer 132 serves as the bump pads so as to electrically connect to the fingerprint identification sensing chip 230 and the printed circuit board 240 (please refer to FIG. 2). The longitudinal projection of the first sensing circuit 123 and the longitudinal projection of the second sensing circuit 133 are staggered from each other without overlapping. In addition, the trace width and the trace spacing of the first sensing circuit 123 and/or the second sensing circuit 133 are less than or equal to 30 μm (≤30 μm) so as to meet the requirements in signal sensitivity.

The insulating protective layer 130 is made of a flexible and bendable insulating material or dielectric material, and disposed on the second surface 121 of the first insulating layer 120 so as to partially cover the second patterned circuit layer 132 and the second sensing circuit 133. Moreover, the bump pads 134 are exposed from the insulating protective layer 134, so the bump pads 134 do not be covered by the insulating protective layer 134.

The second insulating layer 150 is made of a flexible and bendable dielectric material or insulating material. The second insulating layer 150 has a third surface 151 and a fourth surface 152 opposite to each other, and is disposed on the first surface 119 of the first insulating layer 120 in order to cover the exposed first patterned circuit layer 122 and the first surface 119 of the first insulating layer 120. Further, the fourth surface 152 of the second insulating layer 150 and the first surface 119 of the first insulating layer 120 pass through a common plane.

The second conductive post 126 is embedded in the second insulating layer 150. One of the end surfaces of the second conductive post 126 is electrically connected to the first patterned circuit layer 122 and the other of the end surfaces thereof is exposed from the third surface 151 of the second insulating layer 150.

The shielding layer 140 is formed by a patterned metal layer 142 disposed on the third surface 151 of the second insulating layer 150 and electrically connected to the exposed end surface of the second conductive post 126. The longitudinal projection zone of the shielding layer 140 corresponding to the first sensing circuit 123 and the second sensing circuit 133 is hollowed out to serve as a fingerprint sensing area 160.

The first patterned circuit layer 122 and the second patterned circuit layer 132 are fine-pinch circuits manufactured by photolithography and electroplating. In addition, the trace width and the trace spacing of the first patterned circuit layer 122 and the second patterned circuit layer 132 are less than or equal to 30 μm (≤30 μm) so as to meet the requirements in signal sensitivity. In another embodiment, the first patterned circuit layer 122 may be an embedded circuit, and the trace width and the trace spacing thereof can be less than or equal to 15 μm (≤15 μm). Furthermore, the total thickness of the smart card fingerprint identification module packaging structure 100 may be less than or equal to 150 μm (≤150 μm).

The first insulating layer 120, the insulating protective layer 130 and the second insulating layer 150 are made of a flexible and bendable dielectric material or insulating material, such as the dielectric material having polyimide (PI) and/or epoxy as the major component thereof, a photosensitive dielectric material or other flexible insulating materials.

Figure 2:
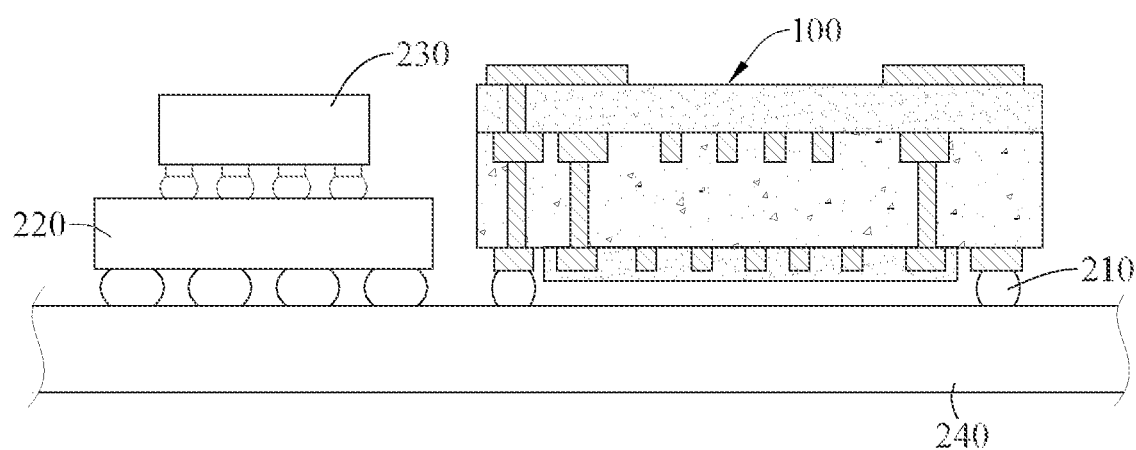
FIG. 2 is a schematic view of a structure of an IC fingerprint chip card in accordance with one embodiment of the present invention.

Please refer to FIG. 2, which is a schematic view of a structure of an IC fingerprint chip card in accordance with one embodiment of the present invention. The IC fingerprinted chip card 300 includes a smart card fingerprint identification module packaging structure 100, an interposer 220, a fingerprint identification sensing chip 230 and a printed circuit board 240. The smart card fingerprint identification module packaging structure 100 can be electrically connected to the printed circuit board 240 via the packaging solder balls 210 and the bump pads 134. Besides, the smart card fingerprint identification module packaging structure 100 and the fingerprint identification sensing chip 230 are separately packaged on the printed circuit board 240 (via the interposer 220).

In addition, the smart card fingerprint identification module packaging structure 100 serves as the fingerprint sensing structure of the IC fingerprint chip card 300. In this case, a user can insert the IC fingerprint chip card 300 into a card reader first and put one of his/her fingers on the sensing area 160 of the smart card fingerprint identification module packaging structure 100. Then, the fingerprint identification sensing chip 230 inside the IC fingerprint chip card 300 can automatically process the relevant sensing information and transmit the finger verification message to a bank, which can serve as the basis for transferring or payment approval.

Figure 3:
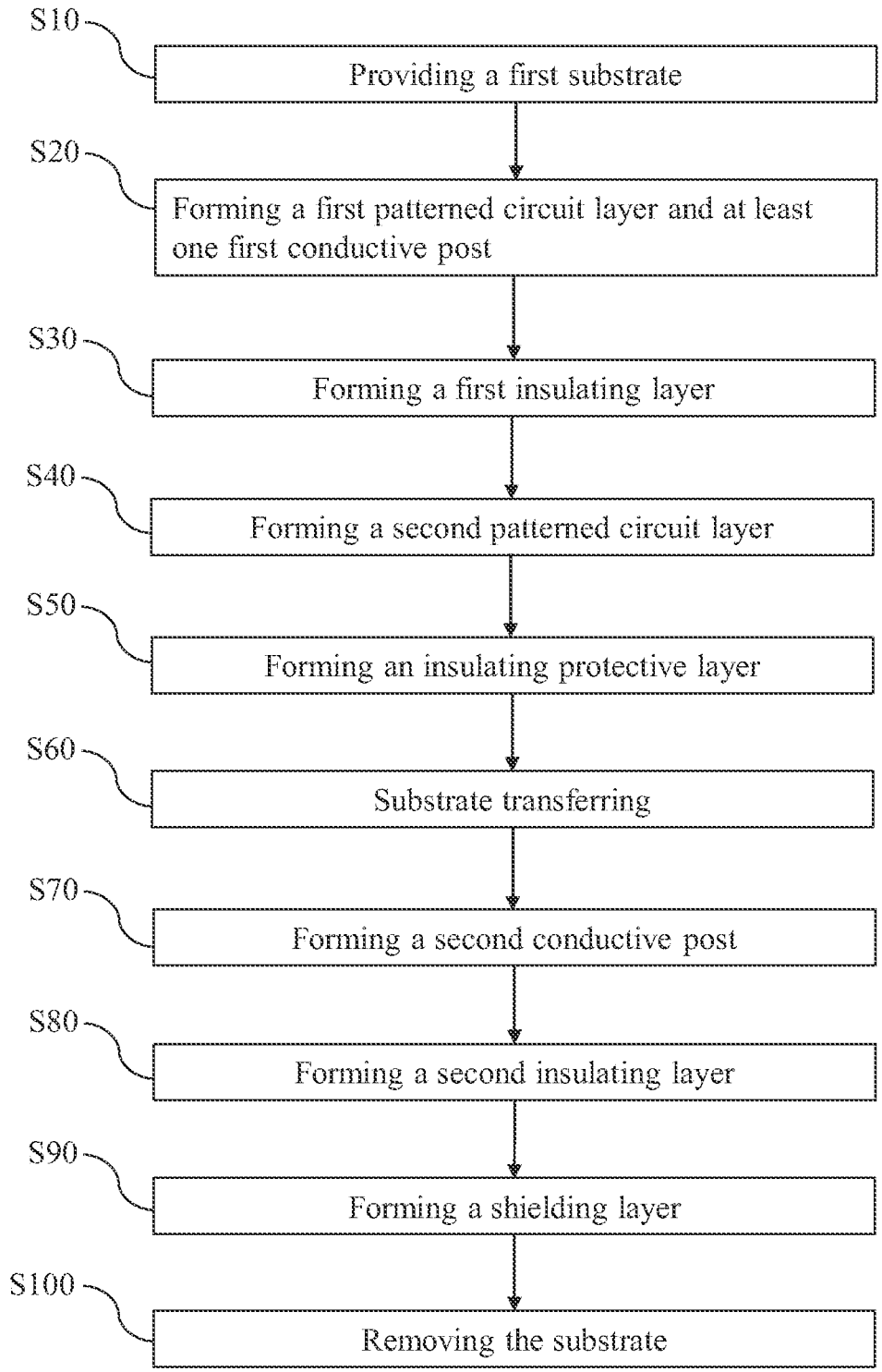
FIG. 3 is a flow chart of a manufacturing method of a smart card fingerprint identification module packaging structure in accordance with one embodiment of the present invention.
Figure 4A:
FIG. 4A~FIG. 4H are schematic views of the manufacturing method of the smart card fingerprint identification module packaging structure in accordance with one embodiment of the present invention.
Figure 4B:
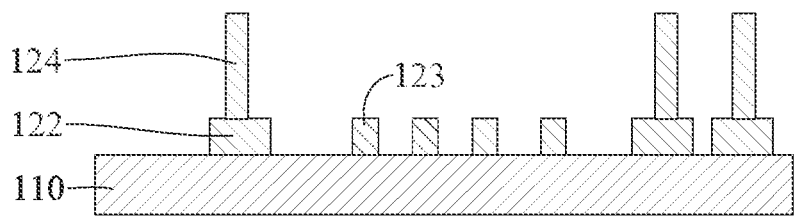
Figure 4C:
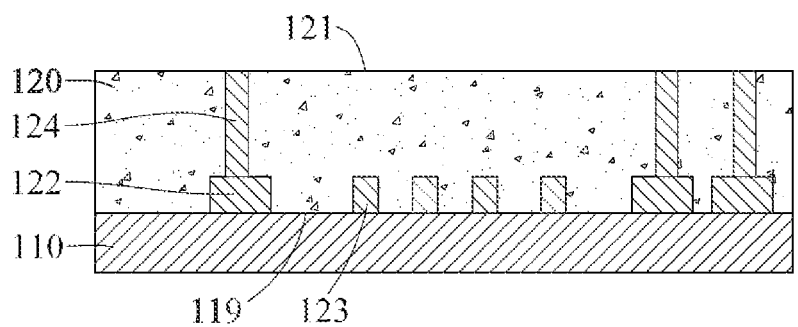
Figure 4D:
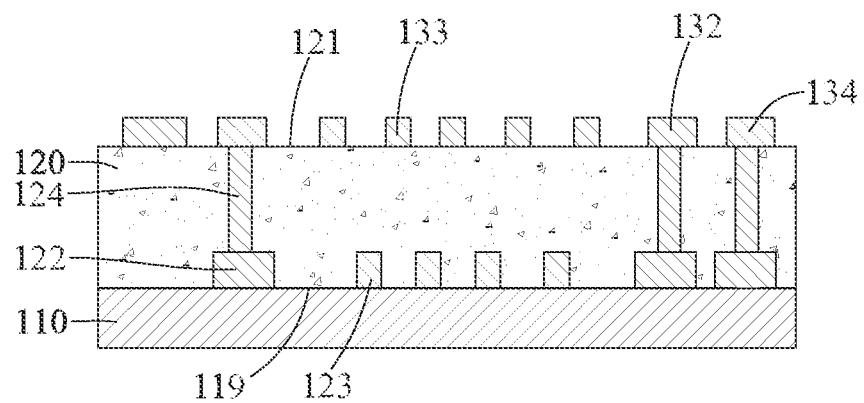
Figure 4E:
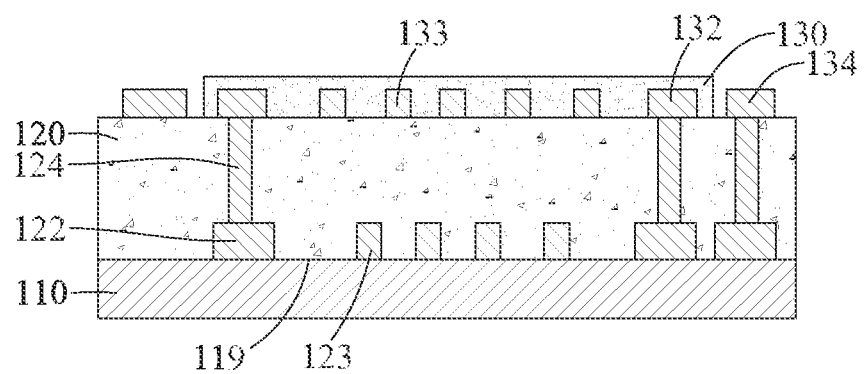
Figure 4F:
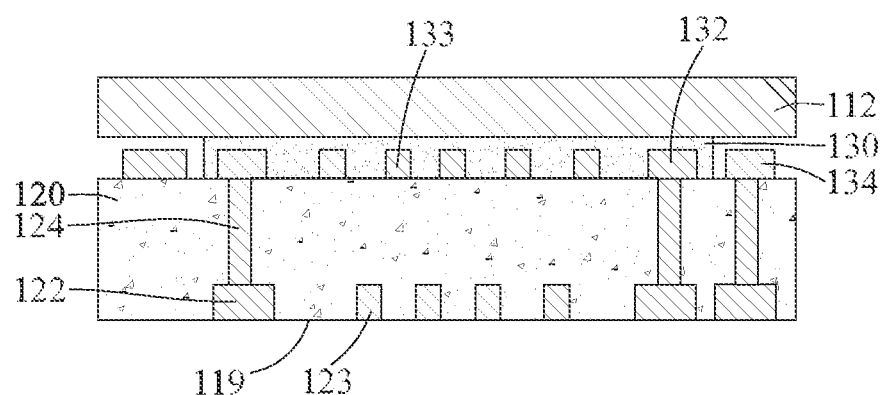
Figure 4G:
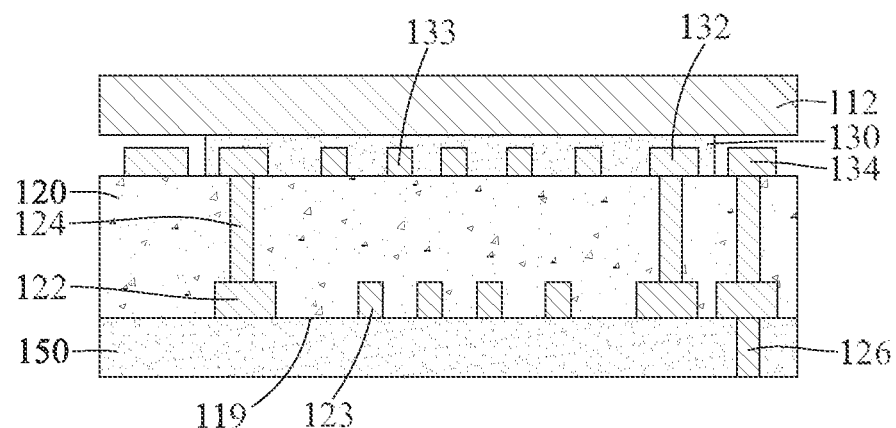
Figure 4H:
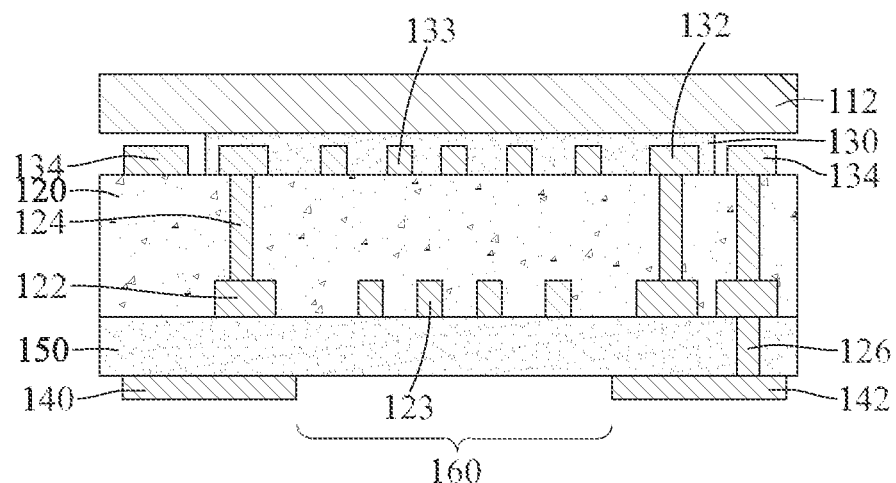

Please refer to FIG. 3, which is a flow chart of a manufacturing method of a smart card fingerprint identification module packaging structure in accordance with one embodiment of the present invention (please also refer to FIG. 4A~FIG. 4H, which are schematic views of the manufacturing method of the smart card fingerprint identification module packaging structure in accordance with one embodiment of the present invention).

The first step of the method is Step S10 (please refer to FIG. 4A): providing a first substrate 110. The first substrate 110 is a metal substrate for mounting the smart card fingerprint identification module packaging structure 100 and facilitating the following manufacturing steps thereof, such as manufacturing the conductive circuits or sensing circuits of the smart card fingerprint identification module packaging structure 100.

Step S20 (please refer to FIG. 4B): forming a first patterned circuit layer 122 and at least one first conductive post 124 on the first substrate by photolithography and electroplating. A part of the first patterned circuit layer 122 serves as a first sensing circuit 123.

Step S30 (please refer to FIG. 4C): forming a first insulating layer 120, made of a flexible and bendable dielectric material or insulating material, on the first substrate 110 to cover the first patterned circuit layer 122 and the first conductive post 124 and removing a part of the first insulating layer 120 to expose the end surface of the first conductive post 124. The first insulating layer 120 has a first surface 119 and a second surface 121 opposite to each other.

Step S40 (please refer to FIG. 4D): forming a second patterned circuit layer 132 on the second surface 121 of the first insulating layer 120 by the photolithography and the electroplating. The second patterned circuit layer 132 is electrically connected to the exposed end surface of the first conductive post 124. A part of the second patterned circuit layer 132 serves as a second sensing circuit 133 and another part of the second patterned circuit layer 132 serves as bump pads 134.

Step S50 (please refer to FIG. 4E): forming an insulating protective layer 130, made of a flexible and bendable dielectric material or insulating material, on the second surface 121 of the first insulating layer 120 to partially cover the second patterned circuit layer 132 and the second sensing circuit 133, and exposing the bump pads 134. Moreover, an anti-oxidation treatment may be further performed for the surfaces of the bump pads 134. The anti-oxidation treatment may be electroplating or chemical plating (e.g., Ni/Au or Ni/Pd/Au).

Step S60 (please refer to FIG. 4F): providing a second substrate 112 and combining the second substrate 112, made of another metal material, with the insulating protective layer 130, and totally removing the first substrate 110 to expose the surface of one side of the first patterned circuit layer 122 and the first surface 119 of the first insulating layer 120.

Step S70 (please refer to FIG. 4G): forming at least one second conductive post 126 on the exposed surface of the first patterned circuit layer 122 by photolithography and electroplating. The second conductive post 126 may be a metal post, such as a cooper post.

Step S80 (please refer to FIG. 4G): forming a second insulating layer 150, made of a flexible and bendable dielectric material or insulating material, on the first surface 119 of the first insulating layer 120 to cover the second conductive post 126, the first patterned circuit layer 122 and the first surface 119 of the first insulating layer 120, and removing a part of the second insulating layer 150 to expose one of the end surfaces of the second conductive post 126.

Step S90 (please refer to FIG. 4H): forming a patterned metal layer 142 on the second insulating layer 150 by photolithography and electroplating to serve as a shielding layer 140 electrically connected to the exposed end surface of the second conductive post 126. The longitudinal projection zone of the shielding layer 140 corresponding to the first sensing circuit 123 and the second sensing circuit 133 is hollowed out to serve as a fingerprint sensing area 160. Moreover, an anti-oxidation treatment may be further performed for the shielding layer 140. The anti-oxidation treatment may be electroplating or chemical plating (e.g., Ni/Au or Ni/Pd/Au).

Finally, Step S100: removing the second substrate 112 to expose the insulating protective layer 130 and the bump pads 134. In this way, the smart card fingerprint identification module packaging structure 100, as shown in FIG. 1, can be obtained.

Furthermore, the aforementioned manufacturing method according to the embodiment of the present invention can be also realized by the large substrate packaging technology, which can more effectively reduce the manufacturing cost of the smart card fingerprint identification module packaging structure 100.

To sum up, compared with currently available intelligent fingerprint identification cards, the present invention may have the following advantages:

(1) According to the embodiment of the present invention, the smart card fingerprint identification module packaging structure 100 and the fingerprint identification sensing chip 230 are separately packaged in the printed circuit board 240, which can definitely increase the flexibility of the designs of the fingerprint identification products and the component layout thereof.

(2) According to the embodiment of the present invention, the special design of separately packaging the smart card fingerprint identification module packaging structure 100 and the fingerprint identification sensing chip 230 on the printed circuit board 240 can effectively prevent from the interference between the smart card fingerprint identification module packaging structure 100 and the fingerprint identification sensing chip 230. Thus, the above design can avoid that the fingerprint identification sensing chip 230 is penetrated through by the static electricity generated by the smart card fingerprint identification module packaging structure 100, which can effectively enhance the antistatic ability thereof.

(3) According to the embodiment of the present invention, the special design of separately packaging the smart card fingerprint identification module packaging structure 100 and the fingerprint identification sensing chip 230 on the printed circuit board 240 can effectively decrease the size and the cost of the fingerprint identification sensing chip 230.

(4) According to the embodiment of the present invention, the special design of manufacturing the smart card fingerprint identification module packaging structure 100 via the substrate packaging structure can be realized by the large substrate packaging technology, which can effectively reduce the manufacturing cost of the smart card fingerprint identification module packaging structure 100.

(5) According to the embodiment of the present invention, the special design of manufacturing the smart card fingerprint identification module packaging structure 100 by a flexible and bendable packaging substrate can make sure that the function of the IC fingerprint chip card can normally work when the IC fingerprint chip card is bent by external force.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A smart card fingerprint identification module packaging structure, comprising:
   a first insulating layer having a first surface and a second surface opposite to the each other;
   a first patterned circuit layer embedded in the first insulating layer, wherein one side of the first patterned circuit layer is exposed from the first surface of the first insulating layer and a part of the first patterned circuit layer serves as a first sensing circuit;
   at least one first conductive post embedded in the first insulating layer, wherein one of end surfaces of the first conductive post is electrically connected to the first patterned circuit layer and the other of the end surfaces of the first conductive post is exposed from the second surface of the first insulating layer;
   a second patterned circuit layer disposed on the second surface of the first insulating layer and electrically connected to the end surface, exposed from the second surface of the first insulating layer, of the first conductive post, wherein a part of the second patterned circuit layer serves as a second sensing circuit and another part of the second patterned circuit layer serves as a bump pad;
   an insulating protective layer disposed on the second surface of the first insulating layer to partially cover the second patterned circuit layer and the second sensing circuit, whereby the bump pad is exposed;
   a second insulating layer having a third surface and a fourth surface opposite to each other, and disposed on the first surface of the first insulating layer in order to cover the first patterned circuit layer and the first surface of the first insulating layer, wherein the fourth surface of the second insulating layer and the first surface of the first insulating layer pass through a common plane;
   at least one second conductive post embedded in the second insulating layer, wherein one of end surfaces of the second conductive post is electrically connected to the first patterned circuit layer and the other of the end surfaces of the second conductive post is exposed from the third surface of the second insulating layer; and
   a shielding layer formed by a patterned metal layer disposed on the third surface of the second insulating layer and electrically connected to the end surface, exposed from the third surface of the second insulating layer, of the second conductive post, wherein a longitudinal projection zone of the shielding layer corresponding to the first sensing circuit and the second sensing circuit is hollowed out to serve as a fingerprint sensing area.

2. The smart card fingerprint identification module packaging structure of claim 1, wherein the first insulating layer, the second insulating layer and the insulating protective layer are made of a flexible and bendable dielectric material or an insulating material.

3. The smart card fingerprint identification module packaging structure of claim 1, wherein a longitudinal projection of the first sensing circuit and a longitudinal projection of the second sensing circuit are staggered from each other without overlapping.

4. The smart card fingerprint identification module packaging structure of claim 1, wherein a trace width and a trace spacing of the first sensing circuit and/or the second sensing circuit are less than or equal to 30 μm.

5. The smart card fingerprint identification module packaging structure of claim 1, wherein a total thickness of the smart card fingerprint identification module packaging structure is less than or equal to 150 μm.

6. A manufacturing method of a smart card fingerprint identification module packaging structure, comprising:
   providing a first substrate;
   forming a first patterned circuit layer and at least one first conductive post on the first substrate by photolithography and electroplating, wherein the first conductive post is erected on the first patterned circuit layer and a part of the first patterned circuit layer serves as a first sensing circuit;
   forming a first insulating layer on the first substrate to cover the first patterned circuit layer and the first conductive post and removing a part of the first insulating layer to expose an end surface of the first conductive post;
   forming a second patterned circuit layer on the first insulating layer by photolithography and electroplating, wherein the second patterned circuit layer is electrically connected to the end surface, exposed from the first insulating layer, of the first conductive post, and a part of the second patterned circuit layer serves as a second sensing circuit and another part of the second patterned circuit layer serves as a bump pad;
   forming an insulating protective layer on the first insulating layer to partially cover the second patterned circuit layer and the second sensing circuit, whereby the bump pad is exposed;
   providing a second substrate and combining the second substrate with the insulating protective layer, and totally removing the first substrate to expose a surface of one side of the first patterned circuit layer and a surface of one side of the first insulating layer;
   forming at least one second conductive post on the surface of an exposed side of the first patterned circuit layer by photolithography and electroplating;
   forming a second insulating layer on a surface of the first insulating layer to cover the surface of the exposed side of the first patterned circuit layer and the second conductive post, and removing a part of the second insulating layer to expose an end surface of the second conductive post;
   forming a patterned metal layer on the second insulating layer by photolithography and electroplating to serve as a shielding layer electrically connected to the end surface, exposed from the second insulating layer, of the second conductive post, wherein a longitudinal projection zone of the shielding layer corresponding to the first sensing circuit and the second sensing circuit is hollowed out to serve as a fingerprint sensing area; and
   removing the second substrate to expose the insulating protective layer and the bump pad.

7. The manufacturing method of the smart card fingerprint identification module packaging structure of claim 6, wherein the first insulating layer, the second insulating layer and the insulating protective layer are made of a flexible and bendable dielectric material or an insulating material.

8. The manufacturing method of the smart card fingerprint identification module packaging structure of claim 6, wherein a longitudinal projection of the first sensing circuit and a longitudinal projection of the second sensing circuit are staggered from each other without overlapping.

9. The manufacturing method of the smart card fingerprint identification module packaging structure of claim 6, wherein a trace width and a trace spacing of the first sensing circuit and/or the second sensing circuit are less than or equal to 30 μm.

10. The manufacturing method of the smart card fingerprint identification module packaging structure of claim 6, wherein a total thickness of the smart card fingerprint identification module packaging structure is less than or equal to 150 μm.

* * * * *